United States Patent
Morchel et al.

(10) Patent No.: US 6,529,156 B2
(45) Date of Patent: Mar. 4, 2003

(54) SELF CALIBRATION OF TRANSPONDER APPARATUS

(75) Inventors: Herman G. Morchel, Nutley, NJ (US); Donald J. Kocian, Springfield, MO (US); Dietrich W. Diecke, New Providence, NJ (US)

(73) Assignee: ITT Defense and Electronics, McLean, VA (US)

( * ) Notice: Subject to any disclaimer, the term of this patent is extended or adjusted under 35 U.S.C. 154(b) by 0 days.

(21) Appl. No.: 09/875,287

(22) Filed: Jun. 7, 2001

(65) Prior Publication Data

US 2002/0186163 A1 Dec. 12, 2002

(51) Int. Cl.$^7$ ............................. G01S 7/40; G01S 13/74
(52) U.S. Cl. ..................... 342/172; 342/41; 342/42; 342/43; 342/44; 342/51; 342/169; 342/173; 342/174
(58) Field of Search ................ 342/42–51, 165–175, 342/195, 29, 30, 31, 32, 41

(56) References Cited

U.S. PATENT DOCUMENTS

| | | | | |
|---|---|---|---|---|
| 3,656,159 A | * | 4/1972 | Kingsbury | ............... 342/51 |
| 3,706,992 A | * | 12/1972 | Brisse et al. | ................ 342/47 |
| 3,803,607 A | | 4/1974 | Robinson | |
| 4,040,054 A | | 8/1977 | Overman | |
| 4,438,435 A | * | 3/1984 | Hofgen et al. | ............... 342/47 |
| 4,492,961 A | * | 1/1985 | Koller et al. | ............... 342/174 |
| 4,517,568 A | | 5/1985 | Willmore | |
| 4,532,516 A | * | 7/1985 | Frampton et al. | ........... 342/174 |
| 4,654,810 A | * | 3/1987 | Becker et al. | ............... 342/174 |
| 4,677,441 A | * | 6/1987 | Hofgen et al. | ............... 342/174 |

OTHER PUBLICATIONS

"Applied ECM", Van Brunt, ISBN 0–931728–00–2, pp. 346–348,1978; vol. 1; Fifth Printing; Copyrighted to EW Engineering; Dunn Loring, VA.

* cited by examiner

Primary Examiner—Bernarr E. Gregory
(74) Attorney, Agent, or Firm—McDermott, Will & Emery

(57) ABSTRACT

A method and apparatus is provided for remotely and constantly calibrating a transponder by using the ring around phenomenon. A number of different time varying physical quantities, such as for example temperature, signal level, noise, transmission line flex, frequency, and general operational effects, affect the inherent delay in transponders on a time varying basis. The invention relies on a the ring around phenomenon to produce pulse doublets, wherein the distance between the pulses in the pulse doublets correspond to the instantaneous delay in the transponder. The system is configured so that instantaneous variation in the transmission delay is detected and recognized on a pulse by pulse basis and transmitted to the interrogation device, which then functions to calculate the actual delay. Normal operation of the transponder is not affected by the continuous calibration method, and therefore a special calibration mode is not required.

18 Claims, 3 Drawing Sheets

SELF CALIBRATION OF TRANSPONDER APPARATUS

I. FIELD OF INVENTION

This invention relates generally to an apparatus for determining an inherent delay in a transponder, wherein the delay corresponds to various physical quantities. More particularly, the invention concerns a method and apparatus for determining the inherent delay of a transponder on a pulse-by-pulse basis such that variations in the delay, which occur over the course of operation due to variations in various physical quantities such as temperature, pressure, stress, strain and the like, are immediately known. In addition, the method and apparatus of the present invention allow for determination of the transponder delay without interruption of the normal operation of the transponder device.

II. BACKGROUND OF THE INVENTION

At the most fundamental level, radar systems depend on measuring the time delay between a transmitted and a subsequently received signal. The necessary accuracy for the measurement of this delay can be in the sub-microsecond range, and direct measurement of such time intervals is a substantial technical challenge.

In the past the standard procedure of measuring the range accuracy of shipboard radar equipment was to provide a target consisting of a passive reflector situated on a known surveyed point, which is tracked by the ship's radar. This procedure is typically limited to the lower range scales. In order to test higher range scales, an active transponder is used to produce an artificial range, which is added onto the actual separation between the ship's radar and the transponder unit. The resultant sum of actual and artificial ranges is then compared to the range indicated on the shipboard equipment.

Such prior art transponders typically consist of three basic units, a receiver, a clock timer, and a transmitter. The receiver and transmitter are tuned to the frequency of the radar under test. Upon receiving the pulse transmitted by the ship's radar, the clock counts out a specified period of time and triggers the transmitter, which sends an artificial echo return pulse back to the ship's radar. This clock time is directly proportional to the desired artificial range. This artificial range is to be used as the standard against which to compare the radar unit under test, so it must be known to a high degree of accuracy. Since the range is directly related to the time delay, the problem becomes that of determining precisely the elapsed time between reception at the transponder of the pulse transmitted by the ship's radar, and the transmission of the return pulse by the transponder unit. The precision required necessitates that such factors as receiver and transmitter response times and propagation delays in the waveguides and coaxial cables be considered along with the clock time.

In order to obtain the required precision, the total delay time for a signal to complete the signal path through the transponder must be known. In the past a variety of methods have been used to measure this delay time, most of which involved the use of an oscilloscope for the actual measurement. Measurements performed by these different techniques have yielded results, which disagree. These methods involve artificially introducing a triggering signal and watching for the transmitted pulse on an oscilloscope. The time between the trigger signal and generation of the transmit pulse is taken as the total delay time, T. This method requires the selection of appropriate points on the leading edge of each waveform to serve as the beginning and end points of the delay period. This is critical because the rise times of the pulses are on the order of 30 nanoseconds, which is equivalent to 5 yards in range. The pulses also exhibit about 60 nanoseconds of jitter, which at a typical sweep speed (e.g., 0.2:sec/cm) corresponds to a trace movement of 3 millimeters. This jitter must be visually averaged to an accuracy of 0.3 millimeters to meet the desired measurement accuracy capability of 1 yard. In addition, the scope sweep itself must be calibrated by observing the output waveform from a crystal oscillator of known frequency and adjusting the scope. This scope calibration is itself also subject to similar considerations regarding the necessary visual acuity. In order to achieve the time resolution necessary for the measurement, a sweep speed of at least 0.2 $\mu$s/cm would be necessary. This in turn means that the inherent delay can only be measured at limited ranges, for which T is small enough that both pulses can be displayed on the same sweep. Once the measurements are made, the transponder is considered calibrated for any indicated range set into the delay controls.

While modern oscilloscopes have overcome some of the above mentioned measurement difficulties, there remain problems associated with the described prior art delay measurement techniques. A first problem is that it is a static (one time) calibration as opposed to a continuous calibration. Accordingly, variations in the delay, which may be caused for reasons such as a change in temperature, are not accounted for by the system. A second problem is that because the counter circuits in the delay clock may not function perfectly at all ranges and the calibration is performed at a fixed range, a detected delay value may have a further unknown and undeterminable error. A third problem is that if the transponder delay is smaller than the pulse width of the test pulse, it is not possible to determine the amount of the delay. A fourth problem is that normal operation of the transponder and receiver must be halted during the calibration process.

One prior art method for calibrating transponders for aircraft includes manual calibration with test signals. Specifically, in one method while the aircraft is grounded, a ground crew will manually test the transponders on board the aircraft to determine the inherent delay. With the grounded method, the inherent delay information must then be transferred to the active radar systems, wherein it may be subtracted from future detected radar signals. In another method, while the aircraft is in flight, a flight crew may manually test the transponder on board the aircraft to determine the inherent delay. With the in-flight method, the inherent delay information must then be transmitted back to the active radar systems, wherein it may be subtracted from future detected radar signals.

Manual calibration of transponders as described above has an inherent limitation that restricts any practical application. Specifically, any subsequent change in temperature, pressure, stress, strain and the like, will result in an unknown and undeterminable inherent delay in the transponder. As such, unless a transponder is constantly manually calibrated, the true, real-time, delay of the system cannot be determined. However, it is impractical to expend manpower to constantly manually calibrate the transponder. Furthermore, even when a transponder operator calibrates the system in flight, the manual operation is difficult and the results are difficult to communicate to a receiving station in a timely manner.

U.S. Pat. No. 3,803,607 to Robinson, the entire disclosure of which is incorporated herein by reference, is an exemplary prior art ship board ring-around radar system calibrator. Robinson provides a system and method for calibration of a transponder, for use with ship board radar, by measuring the total delay time required from antenna to antenna. In the reference, stray signals from the transmitting antenna of a remote transponder are allowed to enter the receiver of the remote transponder and initiate a self-sustaining "ring-around" oscillation. That portion of the oscillation required for the pulse to travel internally through the transponder from the receiving antenna to the transmitting antenna is the total delay time.

Typically, ring-around is an undesirable phenomenon that creates interference with transponded signals, and/or creates confusing "ghost" echoes of the transponded signals. As such, Robinson is the only prior art transponder calibration system that uses, as opposed to suppressing or eliminating, ring around.

In the reference, a switch sets the transponder into a calibration mode. In the calibration mode, the transponder stops receiving incoming pulses from the ship's radar, and instead initiates a self-sustaining "ring-around" oscillation. The frequency of the oscillation is determined by the time required for the pulse to travel through the space between the transmitting antenna and the receiving antenna. The transponder oscillates with a period of oscillation wherein the total inherent delay of the system may be measured and sent back to the ship's radar. Once the period of inherent delay of the system is measured, the transponder resets back to an operation mode, for transponding signals from the ship. Knowing the previously determined inherent delay of the transponder, the ship's radar then may accurately filter inherent transponder delay from transponded signals.

The system and method as described in Robinson has limitations that restrict its practical application. The first limitation deals with the transponder's inability to transpond signals to active radar detectors while in the calibration mode. For sea faring vessels, whose relative velocity to that of the transponder typically is on the order of 5–30 knots, a radar "black-out" while the Robinson transponder is in calibration mode is not critical. On the other hand, for craft that travel at velocities an order of magnitude faster such as aircraft, such times for radar "black-outs" are critical and may be unacceptable.

The second limitation of Robinson's system that restricts its practical application deals with effects of time varying physical quantities such as temperature, pressure, stress, strain and the like, on the transponder. Specifically, any subsequent change in temperature, pressure, stress, strain and the like, will result in a further unknown and undeterminable inherent delay. As such, unless a transponder in accordance with the teaching of Robinson is constantly calibrated, then the true, real-time, delay of the system cannot be realized. However, if a transponder in accordance with the teaching of Robinson is constantly calibrated, then it would never transpond because it is unable to transpond during a calibration mode.

The third limitation of Robinson's system that restricts its practical application deals with problems associated with minute inherent delays in the transponder. Specifically, if a detected inherent delay in the transponder is smaller than the pulse width of the calibration pulse, the method/system will be unable to determine the amount of the delay.

Accordingly, in view of the foregoing problems, what is needed is a transponder self calibration method and system for remotely determining the inherent delay in a transponder wherein the determined inherent delay is not dependent on distance between the transponder and the active radar.

What is further needed is a transponder self calibration method and system for remotely determining the inherent delay in a transponder when the delay varies over time.

What is still further needed is a transponder self calibration method and system for remotely determining the inherent delay in a transponder that is capable of readily informing the radar system regarding the amount of inherent delay in the transponder when the delay is smaller than the pulse width of the transmitted radar pulse.

What is yet further needed is a transponder self calibration method and system for remotely determining the inherent delay in a transponder that constantly transponds signals to active radar detectors, without disrupting operation of the transponder.

What is still yet further needed is a transponder self calibration method and system for remotely determining the inherent delay in a transponder that constantly updates the inherent delay in the transponder as a result of effects of physical quantities such as temperature, pressure, stress, strain and the like.

III. SUMMARY OF THE INVENTION

It is an object of this invention to provide a transponder self calibration method and system for remotely determining the inherent delay in a transponder wherein the determined inherent delay is not dependent on distance between the transponder and the active radar.

It is still another object of this invention to provide a transponder self calibration method and system for remotely determining the inherent delay in a transponder that is capable of easily informing the radar system regarding the amount of inherent delay in the transponder when the delay is smaller than the pulse width of the transmitted radar pulse.

It is yet another object of this invention to provide a transponder self calibration method and system for remotely determining the inherent delay in a transponder that constantly transponds signals to active radar detectors. Accordingly, a calibration mode which disrupts normal operation is not required.

It is still yet another object of this invention to provide a transponder self calibration method and system for remotely determining the inherent delay in a transponder that constantly updates the inherent delay in the transponder to account for variations in the delay due to changes in temperature, pressure, stress, strain and the like. This is accomplished for each and every pulse transmitted.

The thrust of the present invention is to provide an apparatus for remotely and constantly calibrating a transponder by using the ring around phenomenon. A number of different time varying physical quantities, such as for example temperature, signal level, noise, transmission line flex, frequency, and general operational effects, affect the inherent delay in transponders on a time varying basis. The invention relies on the ring around phenomenon to produce pulse doublets, wherein the distance between the pulses in the pulse doublets correspond to the instantaneous delay in the transponder. The system is configured so that instantaneous variation in the transmission delay is detected and recognized on a pulse by pulse basis.

In general the present invention provides a method of calibrating a transponder comprising the steps of transmitting a first signal comprising a plurality of pulses from a transmitter to the transponder, transmitting a second signal comprising a plurality of pulse doublets from the transponder to the transmitter, wherein the first pulse and the second pulse are separated by a first delay, and determining the inherent delay in the transponder corresponding to the first delay.

In one embodiment of the present invention, the transmitter is remote from the transponder.

In another embodiment of the present invention, the doublets comprise a first pulse, corresponding to an echo of a pulse within the plurality of pulses from the first signal, and a second pulse corresponding to the ring around signal from the transponder. Preferably, the step of transmitting a second signal further includes a step of providing a constant delay with a constant delay element.

In general the present invention further provides a transponder comprising a receiving antennae for receiving input signals, a receiver for synthesizing the received input signals, a constant delay element for adding a constant delay to the synthesized received input signal, a transmitter in communication with the constant delay element for generating an output signal, and an output antennae for transmitting the output signal.

The method and apparatus of the present invention provides important advantages over prior art methods. For example, one advantage is that, as opposed to a one time static measurement, the method of the present invention continually provides current system delay information in response to each received pulse. This delay information is inherently accurate. Another advantage is that there is no need to halt operation of the system to perform calibration. Another advantage is that the present invention automatically incorporates variations in the delay due to changes in operating conditions (e.g., temperature), and provides information concerning such delay variations on a pulse-by-pulse basis. Yet another advantage is that the system is readily operable with radar systems having short pulse width operating modes.

Additional advantages of the present invention will become apparent to those skilled in the art from the following detailed description of exemplary embodiments of the present invention. The invention itself, together with further objects and advantages, can be better understood by reference to the following detailed description and the accompanying drawings.

IV. BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

V. DETAILED DESCRIPTION OF THE INVENTION

In the following description, for the purposes of explanation, numerous specific details are set forth in order to provide a more thorough understanding of the present invention. It will be apparent, however, to one skilled in the art that variations of the embodiments disclosed herein are possible.

Figure 1:
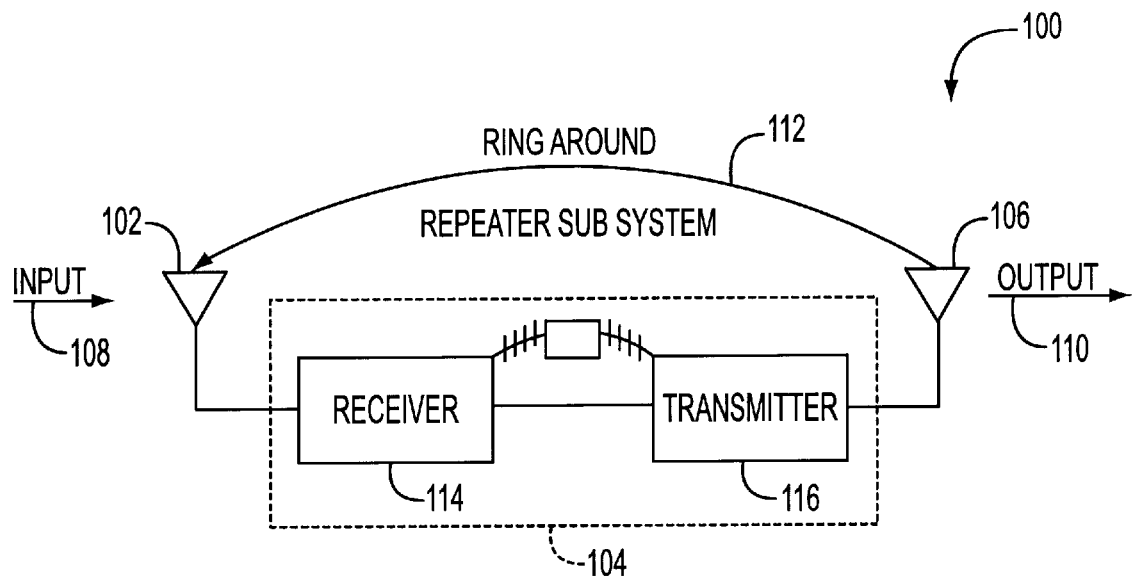
FIG. 1 illustrates an exemplary embodiment of a transponder in accordance with the present invention.

FIG. 1 illustrates an exemplary embodiment of a transponder in accordance with the present invention. The transponder 100 includes a receiving antenna 102 for receiving input signals 108 from a radar (not shown), a repeater subsystem for processing the input signals 108, and an output antenna 106 for transmitting output signals 110 (i.e., return signals) back to the radar (not shown). In the exemplary embodiment, the repeater subsystem 104 includes a receiver 114 and a transmitter 116. It is noted that the repeater subsystem may take many various forms, or may be incorporated as part of a system. For the purposes of the present invention, the essential components of the repeater subsystem 104 comprise the aforementioned receiver 114 and transmitter 116.

The operation of the repeater subsystem 104 is now described. Upon receipt of an interrogation pulse, which may be forwarded, for example, by a radar system, the interrogation pulse is received by the antenna 102 and coupled to the receiver 114. The receiver 114 then functions to demodulate the incoming interrogation signal to produce a pulsed output signal. The output signal of the receiver 114 comprises a pulse for each incoming pulse of the interrogation signal. In other words, a one-to-one correspondence. It is noted that the details of the receiver 114 are not described herein, because the present invention can utilize any standard receiver unit capable of receiving and demodulation incoming RF signals. Such receivers are well known in the art.

The pulsed output signal of the receiver 114 is then utilized to trigger the transmitter 116. Specifically, upon receipt of the pulsed output signal from the receiver 114, the transmitter 116 functions to generate a return pulse, which is then transmitted back to the source of the interrogation signal via the antenna 106. As with the receiver 114, the transmitter 116 can be formed from any standard transmitter unit capable of producing pulsed RF signals. Such transmitter unit are well known in the art.

As explained above, upon receipt of the return pulse, the interrogation system is capable of determining, for example, the distance to the system or platform housing the transponder 100. However, in order to determine the precise distance, the interrogation system must also have data concerning the delay of the transponder 100, namely, the time from receipt of the interrogation signal by the transponder 100 to the transmission of the return signal by the transponder 100.

In order to continually provide such delay information to the interrogation system, upon generation of the initial return signal, the receiver 114 is commanded to stay on (i.e., capable of receiving incoming signals) such that the initial return signal transmitted by antenna 106 is also received by the receiver 114. It is noted that in the preferred embodiment, the output antenna 106 is positioned relative to the input antenna 102 so as to have a sufficient power reduction, such that the initial return signal input back into the receiver 114 does not function to damage the receiver 114. Upon receipt of the initial return signal, the receiver 114 functions to generate a second output pulse or trigger pulse. This trigger pulse is then coupled to the transmitter 116 and functions to control the transmitter 116 such that the transmitter 116 outputs a second return signal.

Thus, for each interrogation signal received by the transponder 100, the transponder functions to generate a pair of return signals. Importantly, the time difference between the leading edge of the first return signal and the leading edge of the second return signal (forming the pair of return signals) represents the internal delay of the transponder 100. As such, the interrogation system can readily compute the internal time delay of the transponder 100 by measuring and comparing the time of arrival of the first return signal and the second return signal. It is further noted, that the delay between the first and second return signals represents the actual/current delay of the transponder 100. Furthermore, as the pair of the return signals are provided for each interrogation signal, the delay information is provided to the interrogation system for each and every interrogation pulse. In other words, the delay information is provided to the interrogation system on a pulse-by-pulse basis. It is noted that the interrogation system must be programmed to expect receipt of the double return pulse, and utilize the delay between the leading edges of the first and second return pulses to calculate the inherent system delay of the transponder 100.

It is noted that prior to the transmission of the second return pulse by the output antenna 106, the receiver 114 is blanked (i.e., turned off) such that the transmission of the second return pulse does not result in the generation of any additional pulses. The length of the blanking period is determined in accordance with the expected characteristics of the interrogation signal (e.g., pulse width, pulse-repetition-frequency, etc.). Of course, other methods of preventing the transmission of additional return pulses, which would otherwise be generated as the result of transmitting the second return pulse are also possible. It is further noted that the blanking signal utilized to "turn-off" the receiver may be supplied by a separate controller (i.e., computer) utilized to control the operation of the receiver 114 and/or the transmitter 116, or may be generated internally in the receiver 114.

Figure 2:
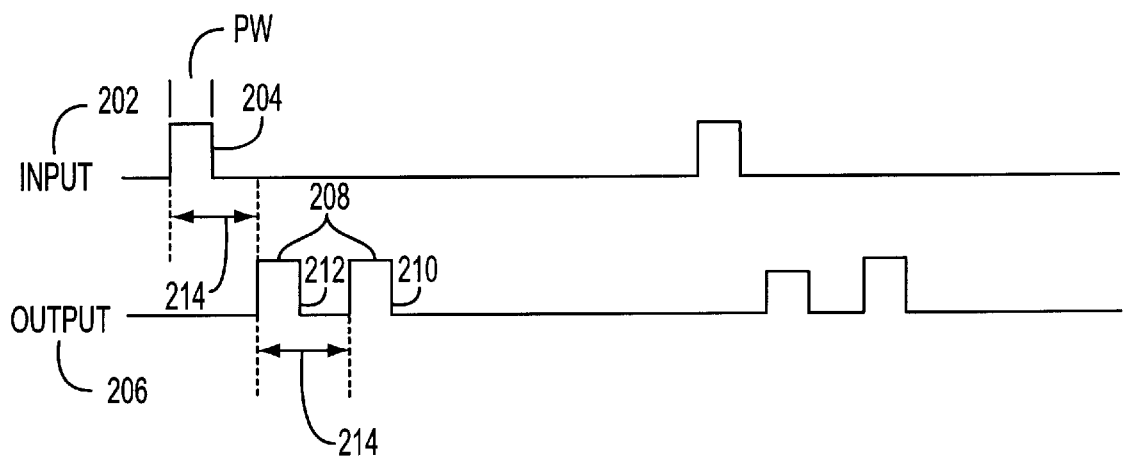
FIG. 2 illustrates a set of timing diagrams illustrative of the operation of the transponder of FIG. 1.

FIG. 2 illustrates an exemplary timing diagram illustrating the operation of the transponder 100. Referring to FIG. 2, an input pulse signal 202, which represents the interrogation signal, is first received at the transponder 100. As noted above, this interrogation signal is detected by the receiver 114, which then triggers the transmitter 116 to generate the first return pulse signal 212, which is transmitted from the transponder 100, via output antenna 106. Upon transmission of the first return pulse 212, the first return pulse 212 is also received by receiver 114. As explained above, receipt of the first return pulse 212 causes the transponder 100 to generate a second return pulse 210. Both the first return pulse 212 and the second return pulse 210 are transmitted back to the interrogation system. The interrogation system then determines the delay of the transponder 100 by measuring the time interval between the first and second return pulse. Referring again to FIG. 2, the signal delay 214 corresponds to the inherent delay in the transponder 100.

Figure 6:
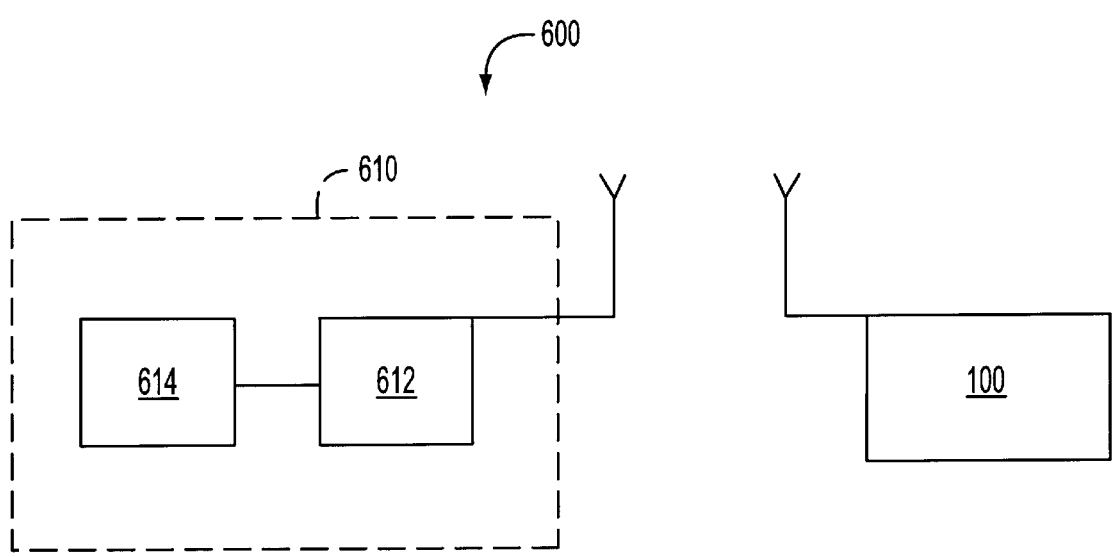
FIG. 6 illustrates an exemplary block diagram of an overall system incorporating the transponder of the present invention.

FIG. 6 illustrates an exemplary block diagram of an overall system 600 incorporating the transponder 100 of the present invention. Referring to FIG. 6, the system 600 comprises an interrogation unit 610, which includes a receiver/transmitter unit 612 and a controller unit 614 for controlling the operation of the receiver/transmitter unit 612, and the transponder 100. The interrogation unit 610, which can be, for example, a radar system, operates to generate an interrogation pulse which is transmitted to the transponder 100. In response to the interrogation pulse, the transponder 100 generates the pair of return pulses as explained above and transmits the pair of return pulses back to the interrogation unit 610. The interrogation unit 610, which has been preprogrammed to expect the pulse pair generated by the transponder 100, marks the time of arrival of both the first return pulse and the second return pulse, and then calculates the time difference between the arrival of the first and second return pulse. This time difference, which represents the internal delay of the transponder 100, is then utilized by the interrogation unit 610 in combination with the time of arrival of the first return pulse to accurately determine, for example, the distance to the transponder 100. It is noted that the foregoing processing of the return pulses by the interrogation unit 610 and calculation of the time difference are done utilizing well known techniques, and therefore will not be further described herein.

It is noted that the present invention continually provides accurate delay information even though the transponder operation (and therefore delay) can vary due to changes in, for example, temperature, pressure, stress, strain and the like. As stated, the present invention determines the inherent delay in the transponder on a pulse-by-pulse basis. Thus, even if the delay of the transponder 100 is constantly changing in a rapid manner, the present invention returns accurate delay information. Moreover, the present invention provides the delay information in the normal operating mode, without any need to disrupt the operation of the transponder 100. Consequently, the receiving radar system is constantly able to determine an accurate measurement of the time varying inherent delay of the transponder 100. Therefore, in contrast to prior art techniques, for craft that travel at velocities an order of magnitude faster than sea faring vessels, such as aircraft, there are no radar "blackouts" required for calibration of the transponder 100.

Figure 4:
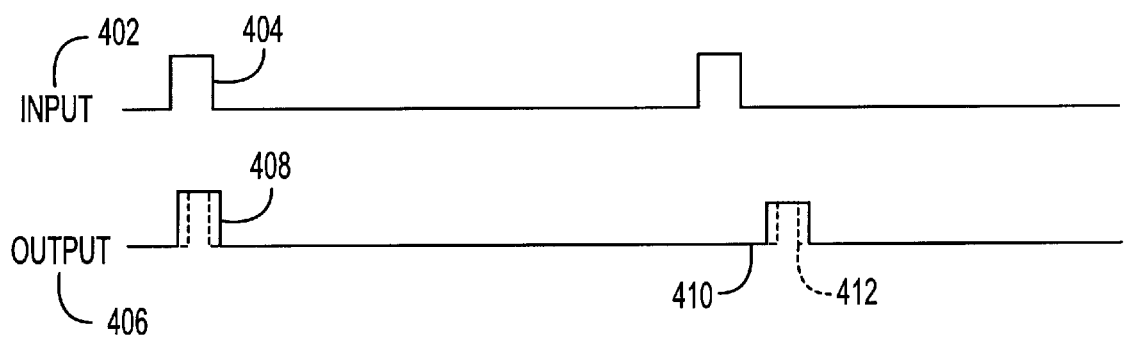
FIG. 4 illustrates a second set of timing diagrams illustrative of the operation of the transponder of FIG. 1.

FIG. 4 relates to a problem scenario which is eliminated by the second embodiment of the present invention. In particular, FIG. 4 depicts the situation wherein due to the pulse width of the interrogation pulse, and the speed in which the transponder 100 can produce the return pulse (i.e., the transponder has minimal delay), the second return pulse effectively becomes an extension of the first return pulse. When this occurs, the interrogation system does not receive the expected pair of return pulses and therefore cannot determine the delay of the transponder 100.

Referring to FIG. 4, the timing diagrams set forth therein illustrate an interrogation pulse signal 402 received at the transponder 100, and an output pulse signal 406 from the transponder 100. The interrogation pulse signal 402 includes a plurality of pulses 404, each having a pulse width (pw). In this example, because the inherent delay in the transponder 100 is minute with respect to the (pw) of each input pulse, the output pulse signal 406 does not include a plurality of pulse doublets. On the contrary, the output pulse signal includes pulses 408, wherein each pulse 408 comprises an overlapping first return pulse 410 corresponding to the echo of the detected input pulse 404, and the second return pulse 412 corresponding to the ring-around feedback of each detected input pulse 404, each having a pulse width (pw).

Figure 3:
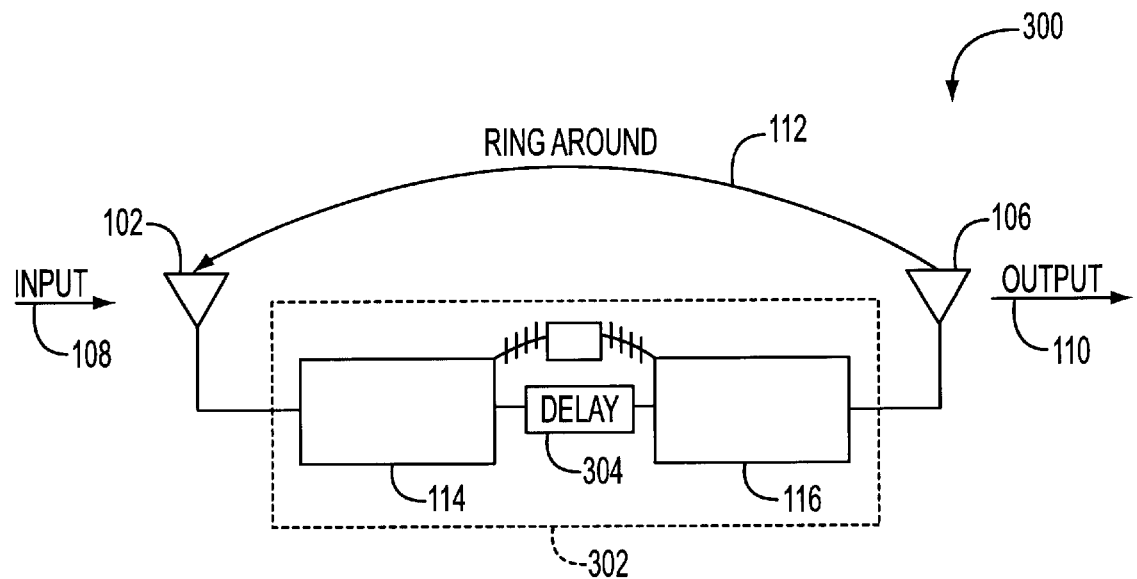
FIG. 3 illustrates a second exemplary embodiment of a transponder in accordance with the present invention.

FIG. 3 illustrates a second exemplary embodiment of the transponder of the present invention which addresses the foregoing problem. Similar components between transponder 100 of FIG. 1 and transponder 300 of FIG. 3, are similarly numbered. The difference between transponder 100 of FIG. 1 and transponder 300 of FIG. 3 includes the addition of a known constant delay element 304 in the repeater subsystem 302. This delay element is required when the system delay is less than the pulse width of the signal being transponded (i.e., the interrogation signal).

Figure 5:
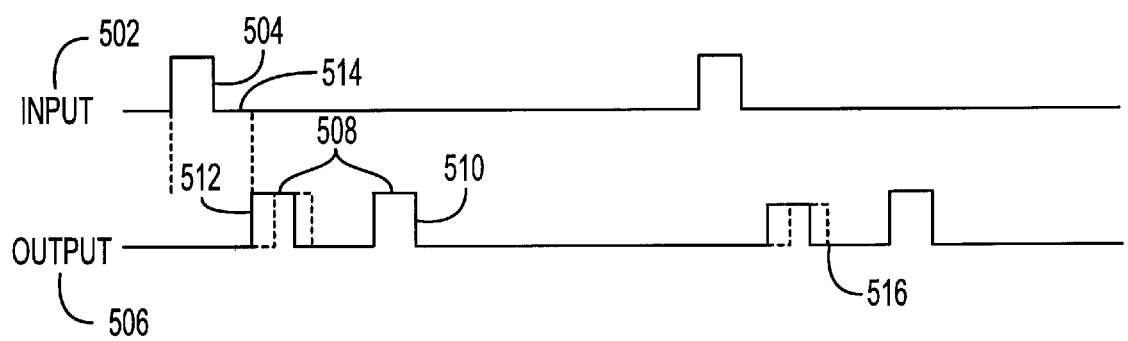
FIG. 5 illustrates a set of timing diagrams illustrative of the operation of the transponder of FIG. 3.

FIG. 5 illustrates timing diagrams which depict the operation of the second embodiment of the present invention. Referring to FIG. 5, an input pulse signal 502 (i.e., interrogation pulse) is received at the transponder 300, and an output pulse signal 506 is generated by the transponder 300. Similar to the voltage diagram of FIG. 2, the input pulse signal 502 includes a plurality of pulses 504, each having a pulse width (pw). For each input pulse 504, the transponder 300 generates a pair of pulses 508, namely, the first return pulse 512 corresponding to the echo of the detected input pulse 504, and the second return pulse 510 corresponding to the ring-around feedback of each detected input pulse 504, each having a pulse width (pw). Signal delay 514 corresponds to the inherent delay in the transponder 300 plus the known constant delay corresponding to delay element 304. As illustrated in FIG. 5, dotted pulse 516 represents the placement of a pulse corresponding to the ring-around feedback when the inherent delay is less than the pulse width (pw), and in the absence of a constant delay corresponding to delay element 304. The addition of the constant delay corresponding to delay element 304, prevents overlapping of the first and second return pulses, when the inherent delay between the pulses is less than a pulse width.

As such, if the transponder 300 has an inherent delay as described above with respect to FIG. 5, then a radar reading the transponded signal will be able to determine the actual inherent delay in the transponder 300. For example, if a radar receiver synthesizes received signals based on edge detection of the pulses, such a radar receiver would be able to differentiate first pulse 512 corresponding to the echo of the detected input pulse 504, and second pulse 510 corresponding to the ring-around feedback of each detected input pulse 504.

It is noted that, as described above, the delay line is added so as to allow for proper operation in situations where the pulse width is greater that the delay through the transponder. Typically, the delay element is a passive device, which is stable and not subject to variations due to, for example, changes in temperature. For example, the delay element can comprise a simple coil. It is noted that the amount of delay added is automatically compensated for by the interrogation unit by the basic method of the invention. As such, it is not necessary for the interrogation unit to know the specific value of the delay element. The difference in time between the first return pulse and the second return pulse, as described previously, still indicates the delay through the transponder, even if there are variations in the delay associated with the delay element.

Although certain specific embodiments of the present invention have been disclosed, it is noted that the present invention may be embodied in other forms without departing from the spirit or essential characteristics thereof. The present embodiments are therefor to be considered in all respects as illustrative and not restrictive, the scope of the invention being indicated by the appended claims, and all changes that come within the meaning and range of equivalency of the claims are therefore intended to be embraced therein.

What is claimed is:

1. A method of calibrating a transponder comprising the steps of:

transmitting a first signal comprising a plurality of pulses from a transmitter to said transponder;

transmitting a second signal comprising a plurality of pulse doublets from said transponder to said transmitter, each of the pulse doublets having a first transponder pulse and a second transponder pulse, wherein said first transponder pulse and said second transponder pulse are separated by a first delay; and determining a delay in said transponder corresponding to said first delay.

2. The method of calibrating a transponder of claim 1, wherein said transmitter is remote from said transponder.

3. The method of calibrating a transponder of claim 1, wherein said first transponder pulse corresponds to an echo of a pulse within said plurality of pulses of said first signal; and a second transponder pulse corresponds to a ring around signal from said transponder.

4. The method of method of calibrating a transponder of claim 3, wherein said step of transmitting a second signal further includes a step of providing a constant delay between said first transponder pulse and said second transponder pulse with a constant delay element.

5. A transponder comprising:

a receiving antenna for receiving input signals;

a receiver for demodulating the received input signals;

a constant delay element for adding a constant delay to said demodulated received input signal;

a transmitter in communication with said constant delay element for generating an output signal; and an output antenna for transmitting said output signal.

6. A method of calibrating a transponder comprising the steps of:

generating an interrogation signal and transmitting said signal to said transponder;

generating a first return pulse upon receipt of said interrogation pulse, said first return pulse being generated by said transponder;

transmitting said first return pulse;

generating a second return pulse upon receipt of said first return pulse, said second return pulse being generated by said transponder; and transmitting said second return pulse, wherein the time difference between the transmission of the first return pulse and the second return pulse represents a delay associated with said transponder.

7. The method of claim 6, wherein said delay associated with the transponder represents the time for the transponder to transmit a return pulse after receipt of said interrogation signal.

8. The method of claim 6, further comprising the steps of:

receiving said first return pulse and said second return pulse, and calculating the difference between the time of arrival of said first return pulse and said second return pulse, said difference representing said delay associated with said transponder.

9. The method of claim 6, wherein said first return pulse and second said return pulse are generated in response to each interrogation signal received by said transponder.

10. The method of claim 6, wherein said transponder is turned off for predetermined period of time after transmission of said second return pulse.

11. The method of claim 6, wherein said generation of said first return pulse and said second return pulse occurs during normal operation of said transponder.

12. An interrogation system comprising:

an interrogation unit including a receiver/transmitter unit, said receiver/transmitter unit which generates and transmits interrogation signals and receives and processes return signals; and a transponder unit which receives said interrogation signals and generates return signals, wherein said transponder unit generates and transmits a first return pulse upon receipt of a first interrogation signal, and generates and transmits a second return pulse upon receipt of said first return pulse, and wherein both said first return pulse and said second return pulse are received by said interrogation unit, and said interrogation unit calculates a delay associated with said transponder unit by measuring the difference between the time of arrival of the first return pulse and the time of arrival of the second return pulse.

13. The interrogation system of claim 12, wherein said delay associated with the transponder unit represents the time for the transponder to transmit a return pulse after receipt of said interrogation signal.

14. The interrogation system of claim 12, wherein said first return pulse and said second return pulse are generated in response to each interrogation signal received by said transponder unit.

15. The interrogation system of claim 12, wherein said transponder is turned off for a predetermined period of time after transmission of said second return pulse.

16. The interrogation system of claim 12, wherein said generation of said first return pulse and said second return pulse occurs during normal operation of said transponder unit.

17. The interrogation system of claim 12, wherein said transponder unit comprises a receiver unit and a transmitter unit.

18. The interrogation system of claim 17, further comprising a delay element operable for increasing the time required for the transponder unit to transmit a return pulse after receipt of said interrogation signal.

* * * * *